United States Patent Office 3,666,334
Patented May 30, 1972

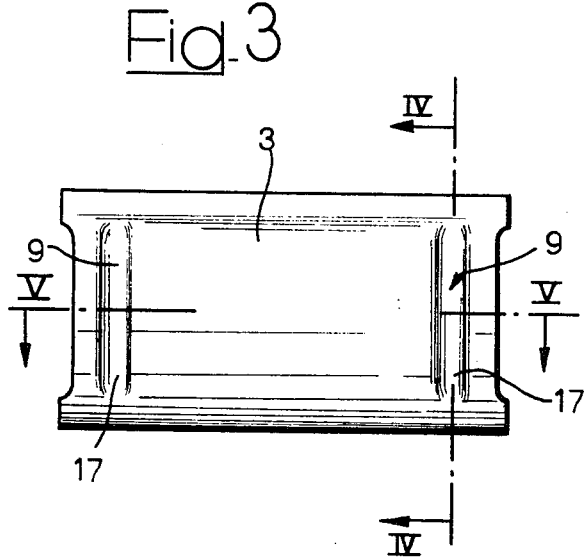
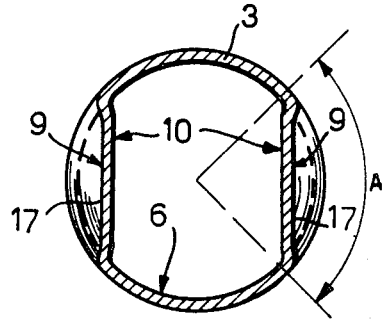
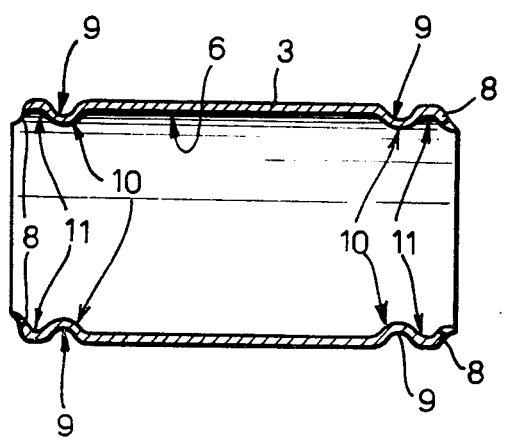

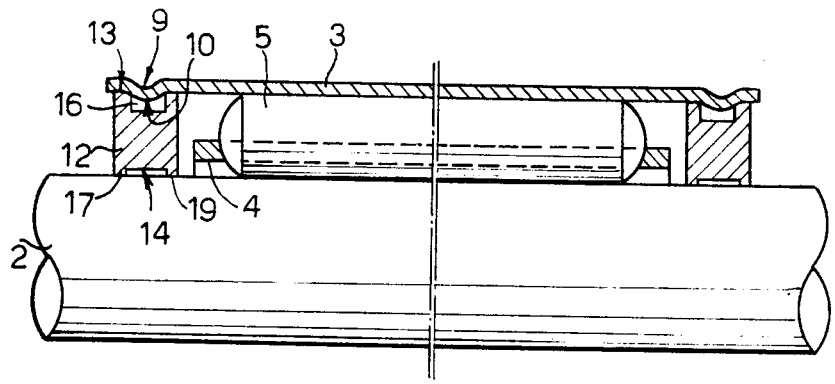
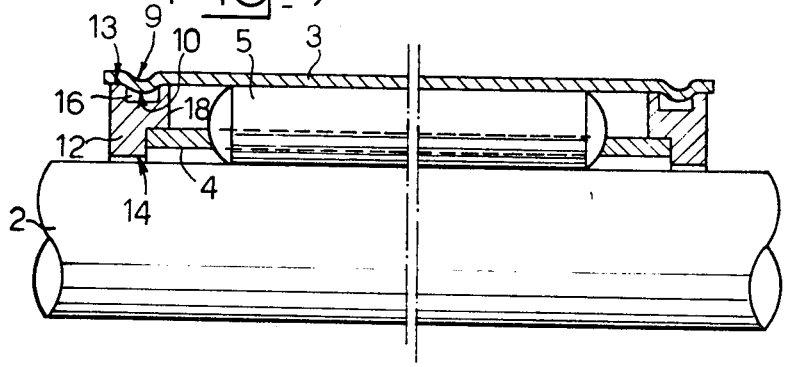

3,666,334
ROLLER BEARINGS, ESPECIALLY NEEDLE
BEARINGS
Dino Senigalliesi, Turin, Italy, assignor to Riv-SKF
Officine di Villar Perosa S.p.A., Turin, Italy
Filed Mar. 8, 1971, Ser. No. 118,258
Claims priority, application Italy, Mar. 27, 1970,
68,042/70
Int. Cl. F16c 33/64
U.S. Cl. 308—213                                8 Claims

ABSTRACT OF THE DISCLOSURE

A roller bearing, and particularly a needle roller bearing having a cylindrical outer casing which has a substantially constant wall thickness throughout its length. Within the outer casing run roller bodies or needle roller bodies and these are located in positions spaced around the inside of the casing by a cage having a pocket for each roller. At each end of the outer casing there is a surface irregularity which may be a circumferential groove or a circumferential ridge, each having radial depth or height. Annular end members adapted to be located and held by the surface irregularities close off the ends of the outer casing and hold the roller cage in place.

BACKGROUND OF THE INVENTION

Previously known roller bearings of type in which the outer casing consists of a substantially cylindrical member have had, at both ends, an edge folded radially inwards. The disadvantage of this type of roller bearing is that when the cage is to be assembled in such an outer casing having solid edges, the cage has to be distorted, and the roller bodies have to be snapped in to the cage pocket individually. This type of assembly is extremely time-consuming and therefore also costly.

In another previously known roller bearing of this type a substantially cylindrical casing has a radially inwardly turned edge, or similar flange, at one end only. This arrangement has been used particularly on needle bearings. In assembly of these known needle-bearings the cage, having been assembled with the rollers, is pushed in to the outer tube from the undeformed end; after this the undeformed end of the outer tube is finally turned in to retain the cage. However, even these roller bearings have a decided disadvantage since after assembly, the outer casing with cage and rollers must be subjected to heating treatment for hardening the outer casing; this detrimentally affects the rollers which are installed, and often also damages the cage and any previously installed linings made of plastics or such like materials. In order to overcome this difficulty the outer casing is often hardened before the cage and the roller bodies are assembled into the casing; in such a case, however, the end which later has to be turned in must be protected from the heating treatment so as to remain sufficiently malleable for this treatment.

Finally, there is a previously known type of needle-bearing in which the outer casing has, at one end, a radially inwardly turned lip and at the other end terminates in a portion of reduced wall thickness, shaped, in cross section, roughly like an S; at this end a terminal ring is used to plug the bore when the bearing is assembled. In this construction, although some of the above mentioned disadvantages are overcome, it is nevertheless not possible to design a bearing which can be manufactured at the lowest possible cost. For one thing the fixed radially inwardly turned edge has to be produced by deep drawing, and also, it requires an additional operation in order to produce the section of reduced wall thickness, and, lastly, the form of the terminal ring is complicated and therefore more expensive than necessary.

SUMMARY OF THE INVENTION

According to the present invention there is provided a roller bearing comprising a substantially cylindrical thin-walled outer casing of substantially constant wall thickness, a plurality of roller elements located within the outer casing by a cage, and an annular end member of each end of the outer casing, axially located and held in position by a radial irregularity in the inner surface of the outer casing formed by deformation of the casing wall and extending at least part of the way around the circumference of the said outer casing.

It will be appreciated that embodiments of this invention are of simple form so that they can be produced and assembled at very low cost and so that in the heating process for hardening the outer casing no special precautions need be taken.

Moreover, with this method of closing both ends of the outer casing the costly production of turned-in side walls or edges are avoided, all that is needed is a simple casing, which undergoes only one single machining process, with no cutting, i.e. the formation of the irregularities which may be grooves, having corresponding projections on the other side of the relatively thin wall, or may be just projections with no corresponding recess on the other side of the wall formed, for example, by longitudinal compression of the casing. The outer cylindrical casing is then in its final form and can next be tempered. After this the cage and the roller bodies are pushed in, and then the annular end members can be snapped into position.

In one embodiment of the present invention, the irregularities are recesses on the outer face of the outer casing having corresponding radially inwardly extending projections which cooperate with a groove in the outer surface of each annular end member to secure the annular end member in position. In such an embodiment the annular end members would be held in position between the radially inwardly directed projections and the said lip.

In another embodiment of the invention the irregularities, or recesses do not run entirely around the circumference of the casing, but are shorter and arranged, for example, so that they lie in pairs across a diameter of the casing. This construction can be advantageous in the manufacture of the outer casing since the recesses can be made on a press, or similar, in which the deforming forces are not applied from all sides nor does the tool or workpiece have to be made to revolve.

The invention defined herein will become more readily understood and further embodiments will become more clear from a consideration of the drawings taken in conjunction with the following description.

BRIEF DESCRIPTION OF THE DRAWINGS

FIG. 3 is a view of the outer casing of a third embodiment of a needle bearing constructed in accordance with the present invention;

FIG. 4 is a cross section along the line IV—IV of FIG. 3;

FIG. 5 is a longitudinal section along the line V—V of FIG. 3;

FIG. 6 is a scrap section of a further embodiment of the invention; and

FIG. 7 is a scrap section of yet another embodiment of this invention.

DESCRIPTION OF THE EMBODIMENTS

Figure 1:
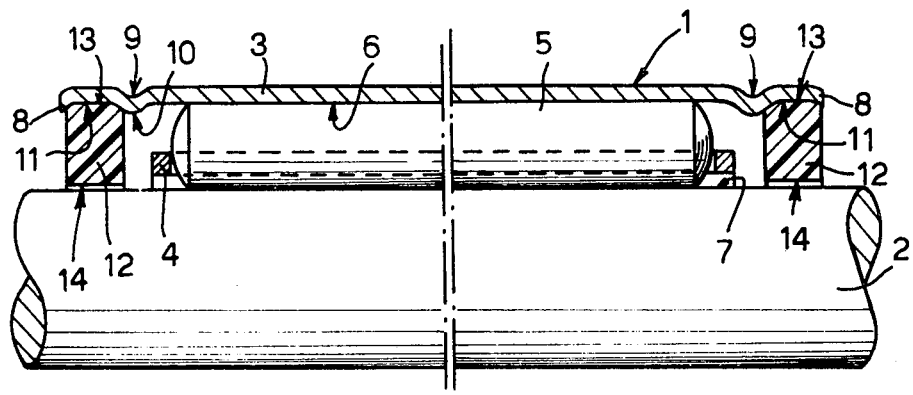
FIG. 1 is a longitudinal cross section of part of one embodiment of a needle bearing constructed in accordance with the present invention.

In FIG. 1 there is shown a needle bearing for bearing a spindle 2. The needle bearing comprises of a relatively thin-walled outer cylindrical casing 3 and a cage 4 having pockets in which are located needle rollers 5 which are retained thereby. The two ends 8 of the outer cylindrical casing 3 are turned slightly radially inwardly. At a small axial distance from each end 8, outwardly facing recesses 9 are formed in the outer casing 3; these recesses extend around the entire circumference of the casing 3. The recesses 9, and the inwardly turned ends 8 act to provide axial location for annular end members 12 which are resilient and held in position thereby. The diameter of the bore 14 of the annular end members 12 is slightly greater than the diameter of the spindle 2, so that the end members 12 of the bearing 1 rotate with the casing without contact with the spindle 2.

The manufacture of the bearing 1 is thus as follows: Starting with an appropriate length of cylindrical material to form the tubular casing 3 the recesses 9 in the outer surface thereof are rolled or curled in, and the ends 8 are slightly radially turned inwards. Next the cylindrical outer casing 3 can be subjected to heating treatment for hardening. After this, the cage 4, within the pockets of which the needle rollers 5 are located, is pushed in to the cylindrical outer casing 3. The pockets of the cage 4 are of such a size that the needle rollers 5 can be pressed towards the bearing centre such that the cage 4 together with the rollers 5 can without difficulty be pushed through past the projections 10 formed on the inner face of the casing 3 by the outwardly facing recesses 9. Finally, the annular end members 12 can be snapped in between the recesses 9 and the ends 8 of the outer casing 3 which are turned slightly radially inwards.

Figure 2:
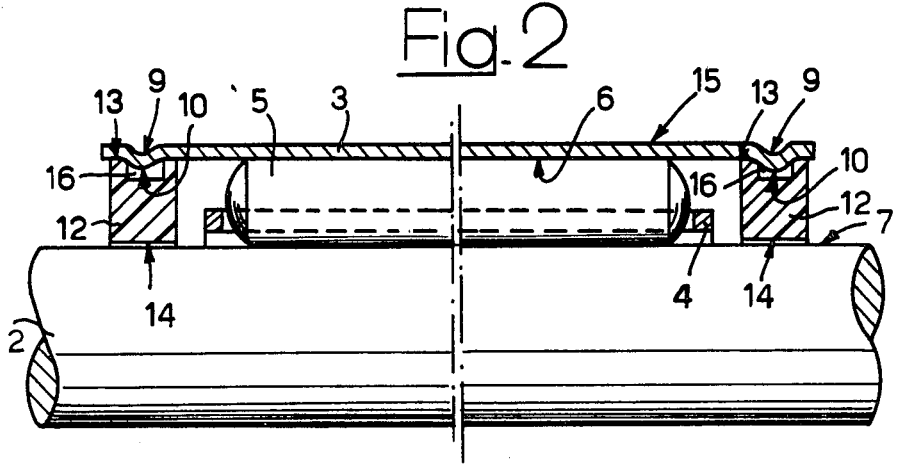
FIG. 2 is a longitudinal cross section of part of a second embodiment of a needle bearing constructed in accordance with the present invention.

The embodiment of needle roller bearing shown in FIG. 2 differs from the embodiment shown in FIG. 1 only in that the annular end members 12 are held in position only by the projections 10 on the inside face of the outer casing 3 formed by the outwardly facing recesses 9. The projections 10 fit into grooves 16 formed in the outer curved surface of the annular end members 12. It is not then necessary for the ends 8 of the outer tube to be turned radially inwardly.

In the embodiment shown in FIGS. 3 to 5 the recesses 9 do not run circumferentially around the whole extent of the cylindrical outer casing 3, but they are interrupted. In this case the recesses 9 and the radially inwardly turned ends 8 extend only over two parts 17 of the circumference of the cylindrical outer casing 3, to cover an angular extent A as shown in FIG. 4.

Referring now to FIG. 6 it is shown that the annular end members 12 can also have other forms. As shown in FIG. 6 the internal cylindrical surface 14 is not smooth but has lips 19 extending radially, and which contact the spindle 2 on which the bearing 1 is mounted, to form a sliding packing therewith.

As shown in FIG. 7 a part 18 of the diameter of the internal cylindrical surface 14 of the annular end members 12 coincides with the outer diameter of the cage 4, and the cage 4 extends into the counterbored part of the bore 14 of the annular end member 12; by this means the cage 4 is borne radially, that is to say, centred within the outer casing 3.

The annular end members located and held in the cylindrical outer casing are preferably made of resilient material such as plastic, rubber, or similar; but it is possible to make these of other materials.

Apart from the specific embodiments which have been described and illustrated it will be apparent that other embodiments of the present invention are possible. For example, the bearing bodies could consist not of needle rollers but of larger rollers or balls.

Many alternative arrangements can be devised without, nevertheless, departing from the spirit and scope of the present invention.

I claim:
1. A roller bearing,
    a substantially cylindrical outer casing for said roller bearing said substantially cylindrical outer casing having thin walls of substantially constant wall thickness throughout the length of said substantially cylindrical outer casing,
    a plurality of roller elements within said substantially cylindrical outer casing,
    a cage within said substantially cylindrical outer casing, said cage locating said roller elements in position,
    annular end members for said substantially cylindrical outer casing,
    radial irregularities formed in said walls of said substantially cylindrical outer casing by deformation thereof, said radial irregularities extending around at least part of the circumference of said substantially cylindrical outer casing, locating and holding said annular end members in position on said substantially cylindrical outer casing.

2. The roller bearing of claim 1 wherein said radial irregularities are recesses extending around the whole of the circumference of said substantially cylindrical outer casing.

3. The roller bearing of claim 1 wherein said radial irregularities are recesses extending only part of the way around the circumference of said substantially cylindrical outer casing, and are located at intervals around said circumference.

4. The roller bearing of claim 3 wherein said recesses are located in pairs spaced across a diameter of said substantially cylindrical outer casing.

5. The roller bearing of claim 1, wherein said radial irregularities are recesses in the outer cylindrical surface of said substantially cylindrical outer casing,
    radiall inwardly extending projections corresponding to said recesses in said outer cylindrical surface of said substantially cylindrical outer casing,
    grooves in the outer cylindrical surface of said annular end members, said grooves cooperating with said inwardly extending projections on said substantially cylindrical outer casing, locating and holding said annular end members in position on said substantially cylindrical outer casing.

6. The roller bearing of claim 1 wherein both ends of said substantially cylindrical outer casing are formed with a circumferential, radially inwardly directed lip.

7. The rolle rbearing of claim 1 wherein said annular end members have an inner cylindrical surface, at least part of said inner cylindrical surface touching the spindle on which said roller bearing is mounted when said roller bearing is mounted on a spindle, thereby forming a sliding packing.

8. The roller bearing of claim 1 wherein said annular end members are counterbored to the outer diameter of said cage, said annular end members supporting said cage for rotation therewith .

References Cited
FOREIGN PATENTS
868,682    2/1953    Germany _____ 308—202

MARTIN P. SCHWADRON, Primary Examiner

F. SUSKO, Assistant Examiner